United States Patent [19]
Fink et al.

[11] Patent Number: 5,634,660
[45] Date of Patent: Jun. 3, 1997

[54] GAS GENERATOR IGNITION UNIT FOR A PASSIVE RESTRAINT SYSTEM

[75] Inventors: Otto Fink, Tüssling; Bernhard Vetter, Bruckmühl, both of Germany

[73] Assignee: Temic Bayern-Chemie Airbag GmbH, Aschau, Germany

[21] Appl. No.: 531,159

[22] Filed: Sep. 19, 1995

[30] Foreign Application Priority Data

Oct. 1, 1994 [DE] Germany ............... 44 35 319.7

[51] Int. Cl.⁶ ........................................... B60R 21/28
[52] U.S. Cl. ........................................ 280/741; 280/735
[58] Field of Search ............................. 280/741, 735

[56] References Cited

U.S. PATENT DOCUMENTS

| | | | |
|---|---|---|---|
| 2,927,498 | 3/1960 | Eilers | 86/1.1 |
| 5,140,906 | 8/1992 | Little, II | 102/202.14 |

FOREIGN PATENT DOCUMENTS

| | | |
|---|---|---|
| 0012626 | 6/1980 | European Pat. Off. |
| 1150491 | 1/1958 | France . |
| 2341836 | 9/1977 | France . |
| 1179492 | 10/1964 | Germany . |
| 1247917 | 8/1967 | Germany . |
| 3447478 | 7/1985 | Germany . |
| 3738436 | 11/1988 | Germany . |
| 4002088 | 8/1990 | Germany . |
| 9017665 | 9/1991 | Germany . |
| 4229624 | 3/1993 | Germany . |
| 552223 | 3/1943 | United Kingdom . |
| WO9410528 | 5/1994 | WIPO . |

*Primary Examiner*—Kenneth R. Rice
*Attorney, Agent, or Firm*—W. G. Fasse; W. F. Fasse

[57] ABSTRACT

Gas generators for passive restraint systems in motor vehicles, particularly for airbag systems or belt pre-tensioner systems, contain a gas generating compound which is ignited by an electrical ignition unit. The present ignition unit makes do with a small number of individual components and does not employ a plug. The connecting devices carrying the electrical ignition pulse are connected directly to the ignition charge without the intermediate circuitry of a plug, and the ignition carrier is formed as an enclosure for the connecting devices.

13 Claims, 2 Drawing Sheets

GAS GENERATOR IGNITION UNIT FOR A PASSIVE RESTRAINT SYSTEM

FIELD OF THE INVENTION

The invention relates to an ignition unit for a passive restraint system gas generator, intended for motor vehicles in particular, comprising an electrical igniter with connecting devices, whereby the electrical igniter encloses a bridge wire carrier which carries the ignition charge and which projects into a propellant charge sleeve filled with propellant charge powder, and an ignition carrier which obturates or closes the propellant charge sleeve, through which the connecting devices are led.

BACKGROUND INFORMATION

A known ignition unit 1' of this type is depicted in FIG. 2 and essentially consists of the following components: an electrical igniter 2' which contains the actual ignition charge, a propellant charge sleeve 5' which contains the propellant charge powder 3', and an ignition carrier 6' which holds and connects the electrical igniter 2' and the filled propellant sleeve 5'. Ignition pulses are directed to the electrical igniter 2' via plug pins 24' by way of a plug (not shown). The plug pins 24' are led through the ignition carrier 6'. In this connection, the receptacle-shaped ignition carrier 6' features a central aperture into which that part of the electrical igniter 2' in which the plug pins 24' are accommodated is fitted. An inner metal tamping or packing sleeve 17' is fitted over that part of the electrical igniter 2' containing the actual ignition charge (ignition capsule), the open end of the sleeve 17' being press-fitted into a circular groove in the ignition carrier 6'. The cylindrical part of the electrical igniter 2' which contains the ignition charge and is made of plastic also performs a tamping or packing function.

The arrangement comprising the ignition carrier 6' with the electrical igniter 2' and the internal tamping sleeve 17' projects into a propellant charge sleeve 5' filled with propellant charge powder 3'. The rim of the propellant charge sleeve 5' forms an interlocking fit with the inner tamping sleeve 17', the flanged rim of which engages a circular groove in the ignition carrier 6', thereby achieving the necessary fastening. In order to prevent penetration by moisture, a sealing ring 23' is installed between the electrical igniter 2', the ignition carrier 6' and the inner tamping sleeve 17'.

Finally, a short-circuit spring 25' is provided in the area occupied by the plug pins 24' in order to prevent inadvertent ignition as a consequence of electrostatic charges.

The known ignition unit 1' depicted in FIG. 2 is composed of a considerable number of individual components which require costly assembly, with the result that an ignition unit of this type is subject to high manufacturing costs. The latter are affected, in particular, by the plug required to conduct the electrical ignition pulse, since this must be provided with a galvanic coating to meet the high safety requirements in the area of the plug contacts.

SUMMARY OF THE INVENTION

The object of the invention is to produce an ignition unit of the type described in the preamble which, in contrast to the known ignition unit, is composed of fewer individual components and, in particular, requires no plug to conduct an electrical ignition pulse.

According to the invention, the ignition unit includes connecting leads which are permanently attached to the bridge wire carrier holding the ignition charge. The ignition carrier is configured as an enclosure for the connecting leads and the bridge wire carrier in such a way that the ignition charge projects from the ignition carrier on the side of the ignition carrier facing the propellant charge sleeve, while the connecting leads are led out of the ignition carrier on the side of the ignition carrier facing away from the propellant charge sleeve.

Thus the essence of the invention comprises a single component (instead of an electrical igniter and a separate ignition carrier), namely an ignition carrier with integral conducting devices that contains both the ignition charge and the lead output, so that these leads can be connected directly to the triggering device for the passive restraint system. In this way, a reduction in costs is achieved through the lower number of individual components required, in particular by the elimination of an electrical plug.

The ignition carrier in accordance with the invention can be made of injection molded plastic, whereby the connecting leads can be connected to the bridge wire carrier by way of a welded connection.

The connection of the propellant charge sleeve to the ignition carrier is effected in an advantageous development of the invention in that the rim of the ignition carrier, over which the propellant charge sleeve is fitted, embodies a groove which accommodates the propellant charge sleeve. The rim can thus be shaped in such a way that a press-fit seat is established with the propellant charge sleeve. Instead of a press-fit seat, the joint can also be established by adhesive bonding or ultrasonic welding.

As an alternative, the attachment of the propellant charge sleeve to the ignition carrier can be configured in such a way that the propellant charge sleeve is similarly fitted over the rim of the ignition carrier to form a press-fit seat, whereby the ignition carrier is provided with a projecting ridge on which the outwardly angled rim of the propellant charge sleeve rests, while a gas generator pressure tube for the ignition unit is configured at the ridge in such a way that the ridge, together with the angled rim, lies in a stepped recess formed in the pressure tube, so that together a pressure damming or sealing joint is formed by means of a circular projecting ridge. Instead of a press-fit seat, the joint can be adhesive-bonded or ultrasonically welded.

In addition, in an advantageous embodiment of the invention, an inner insulating or tamping sleeve can be arranged in such a way that, in the area of the outlet from the bridge wire carrier, a pedestal base is integrated into the ignition carrier, whereby the pedestal base and the inner tamping sleeve are provided with locking devices so that, when the inner tamping sleeve is fitted over the pedestal base, the locking devices engage each other, thus producing an interlocking joint. The locking devices should preferably consist of a circular groove in the base and a circular ridge on the inner rim of the inner tamping sleeve.

Finally, in another advantageous development of the invention, a cup-shaped filing sleeve is provided, the base of which features an aperture having a diameter corresponding to the outer diameter of the inner tamping sleeve, whereby the filing sleeve is arranged in such a way that the inner tamping sleeve projects into the filling sleeve. Thus, in an advantageous way, the inner tamping sleeve is radially supported so that, in the event of ignition taking place, it is not forced out of the locking groove. In addition, a filling sleeve of this type offers a manufacturing advantage in that the filling of the ignition unit with propellant charge powder can be carried out in a position in which the lead outlets hang downwards.

The filling sleeve can preferably be designed in such a way that its outer diameter corresponds to the inner diameter of the propellant charge sleeve.

Finally, a ferrite core can be installed in the vicinity of the connecting leads for EMI protection, which is encased simultaneously with the connecting devices to form the ignition carrier.

BRIEF DESCRIPTION OF THE DRAWINGS

The invention is depicted and explained below with reference to two typical embodiments thereof, which are shown in FIG. 1.

DESCRIPTION OF THE PREFERRED EMBODIMENTS

Figure 1:
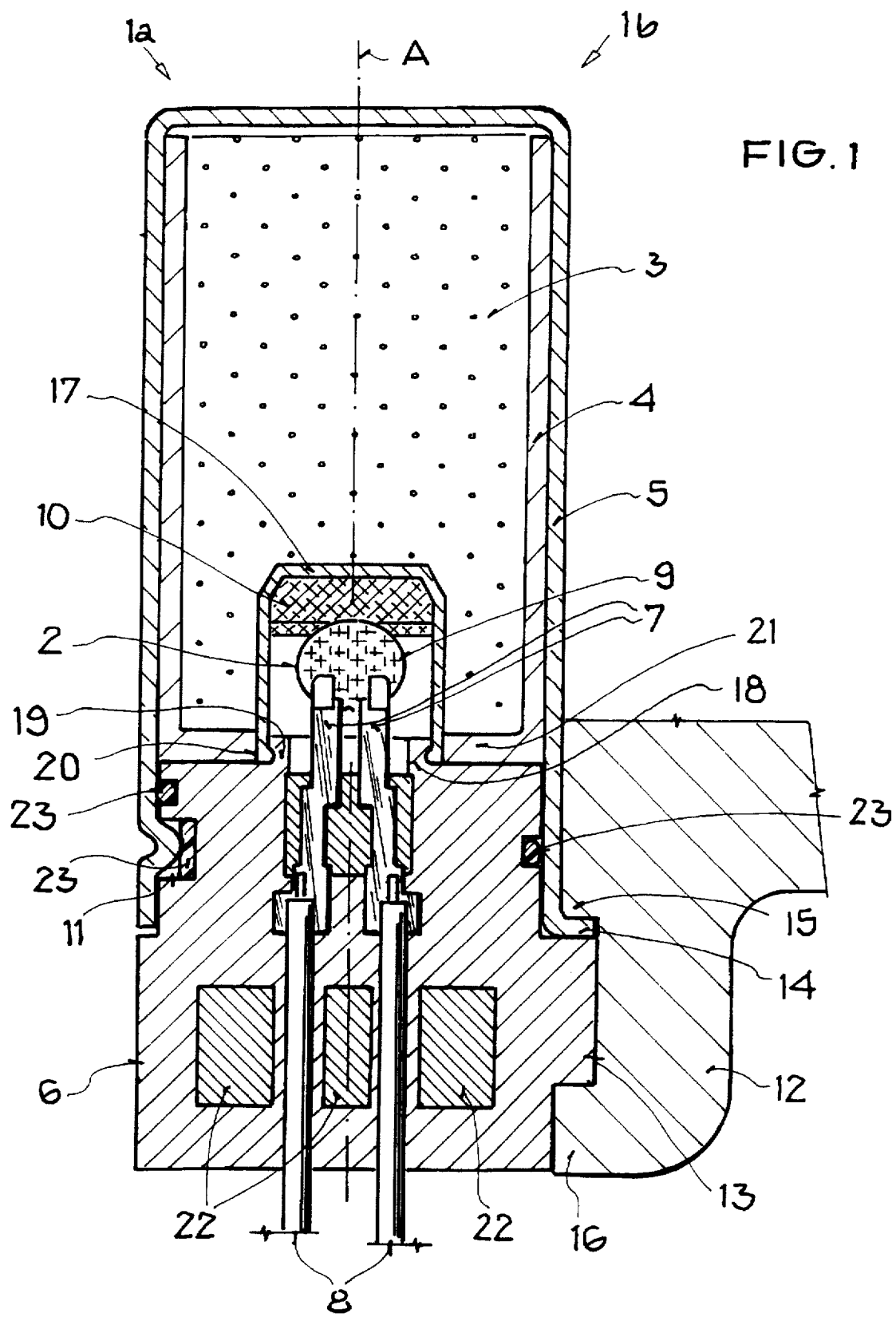
Figure 2:
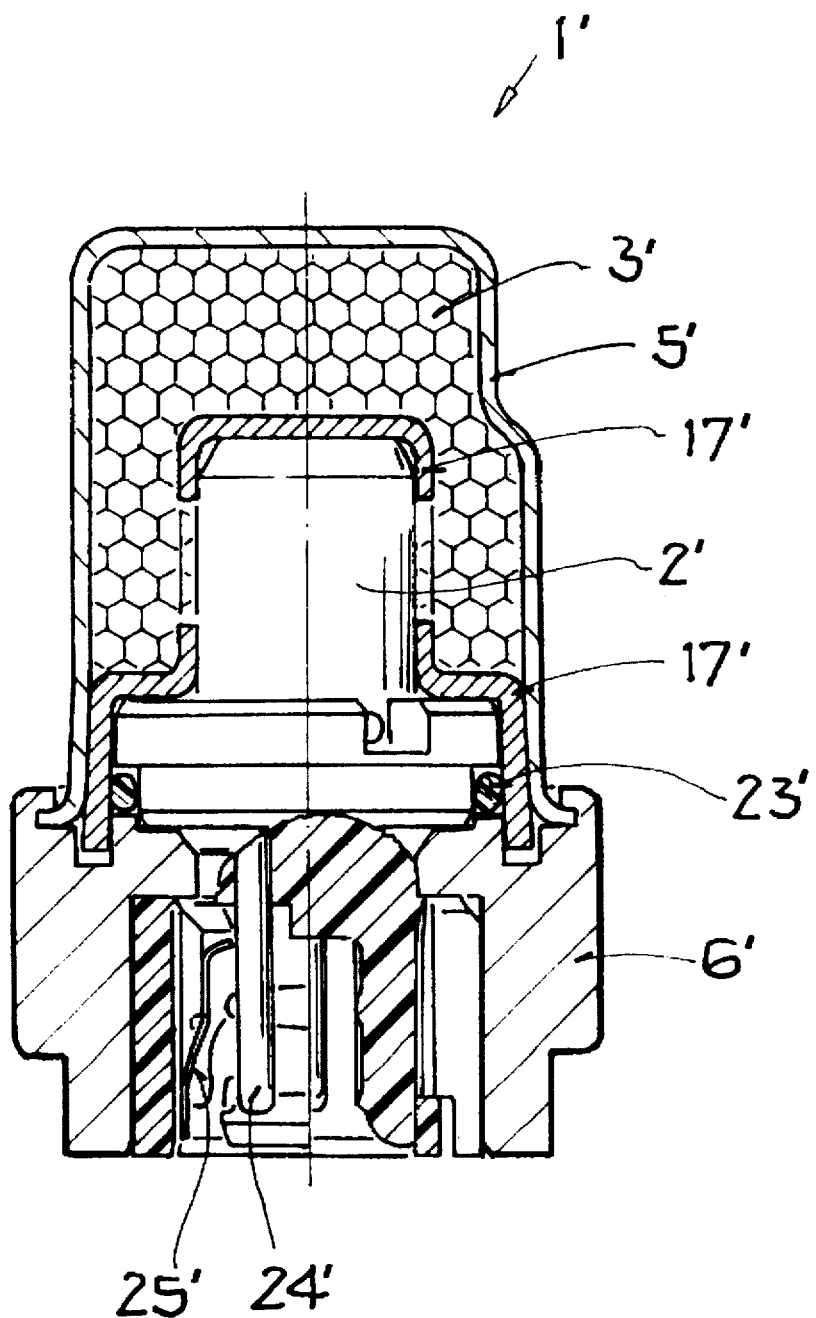
FIG. 2 shows a conventional ignition unit, as described above.

The ignition unit 1, 1a, 1b depicted in FIG. 1 shows an ignition carrier 6 with integral connecting devices for an ignition charge consisting of a primary charge 9 and a secondary charge 10. These connecting devices consist of a bridge wire carrier 7 connected directly to the primary charge 9 (also referred to as the ignition capsule) and connecting leads 8 lying in contact with the bridge wire carrier 7 by way of a welded connection. At the same time, the ignition carrier 6 accommodates a ferrite core 22 for EMI protection, which is arranged in the vicinity of the connecting leads 8. The ignition carrier 6 is configured as an enclosure for the connecting devices 7 and 8, as well as for the ferrite core 22, typically in the form of an injection molding.

An integral pedestal base 18 is formed in the area of the bridge wire carrier 7. The pedestal base 18 projects from the ignition carrier 6 and serves to connect an inner insulating or tamping sleeve 17 enclosing the primary and secondary charges 9 and 10 (fused head). A circular locking groove 19 in the base 18 engages a similar circular locking groove in the open, inner rim of the inner insulating or tamping sleeve 17 when the latter is fitted over the base 18, engaging its locking groove 19.

To accommodate a charge of propellant powder 3, a propellant charge sleeve 5 is provided which also serves as an outer insulating or tamping sleeve, and which is shaped like a cup. To secure the propellant charge sleeve 5, the ignition carrier 6 is cylindrically shaped in the area of the inner insulating or tamping sleeve 17 such that the diameter of the cylindrical extension corresponds to the inner diameter of the propellant sleeve 5. In this way, the propellant charge sleeve 5 can be secured to the cylindrical extension by the formation of a pressfit seat, an adhesive bonded attachment or an ultrasonic weld. Two examples of arrangements whereby the propellant charge sleeve 5 is secured are depicted in FIG. 1.

Thus, an ignition unit 1a is shown on the left of the axis of symmetry A, and an ignition unit 1b is shown on the right of the axis of symmetry A. In the case of ignition unit 1a, the propellant charge sleeve 5 is secured by means of a groove 11 arranged in the cylindrical extension of the ignition carrier 6, whereby the groove 11 accommodates a sealing ring 23. A further sealing ring 23 lies in the area adjoining the groove 11.

In the case of ignition unit 1b, the propellant charge sleeve 5 is secured by another method. In this case, a circular ridge 13 incorporated in the cylindrical extension acts as a stop for the propellant charge sleeve 5. The rim 14 of the propellant charge sleeve 5 is angled outward at 90 degrees, so that the flange thus formed fits the step formed by the ridge 13. When the ignition unit 1b is inserted into a combustion chamber formed as a pressure tube 12, the step formed by the flange 14 comes into contact with a step 15 formed by a stepped recess in the wall of the pressure tube 12. The unencumbered lower step formed by the ridge 13 is now enclosed by the surrounding flange or rim 16 of the recess. To ensure the integrity of the seal in the area of the cylindrical extension of the ignition carrier 6, a sealing ring 23 is also provided.

Finally, in the case of the ignition unit 1a or 1b in accordance with the invention, a filling sleeve 4 is provided, shaped like a cup with an aperture in the base 21. The diameter of the aperture in the base 21 corresponds to the outer diameter of the inner insulating sleeve 17. As a result, the filling sleeve 4 can be pushed over the inner insulating sleeve 17 to the point where its base 21 rests on the ignition carrier 6. The outer diameter of the filling sleeve 4 corresponds to the inner diameter of the propellant charge sleeve 5, so that they are secured together by an interlocking fit.

This filling sleeve 4 has the advantage that it provides radial support for the inner insulating sleeve 17, with the result that the inner sleeve 17 is not forced out of the locking groove 19 on ignition. In addition, the assembly of the ignition unit 1a or 1b is simplified since, during the process of filling with propellant charge powder 3, the ignition unit can be positioned in such a way that the connecting leads 8 hang downward.

As already described above, the ignition carrier 6 is made of plastic, in particular thermosetting plastics. The outer insulating sleeve 5, the inner insulating sleeve 17 and the filing sleeve 4 are either plastic injection moldings or deepdrawn metal components.

We claim:

1. An ignition unit for a gas generator for a passive restraint system for motor vehicles, comprising a propellant charge sleeve containing propellant charge powder, and an electrical igniter, wherein the electrical igniter comprises an ignition charge, a bridge wire carrier which holds the ignition charge and which projects into the propellant charge sleeve containing the propellant charge powder, an ignition carrier which obturates the propellant charge sleeve, and connecting leads extending through the ignition carrier, wherein the connecting leads are permanently connected to the bridge wire carrier, and wherein the ignition carrier is configured as an enclosing holder for the connecting leads and the bridge wire carrier in such a way that the bridge wire carrier projects from the ignition carrier on a side of the ignition carrier facing the propellant charge sleeve, and the connecting leads extend out of the ignition carrier on a side of the ignition carrier facing away from the propellant charge sleeve.

2. The ignition unit in accordance with claim 1 wherein the ignition carrier comprises a rim over which the propellant charge sleeve extends, and wherein the ignition carrier bas a circular groove in the rim, to secure the propellant charge sleeve to the ignition carrier.

3. The ignition unit in accordance with claim 2, further comprising an inner sleeve, wherein the ignition carrier integrally comprises an outlet for the bridge wire carrier, and a pedestal base in the vicinity of the bridge wire carrier outlet, wherein the inner sleeve is arranged on the pedestal base, and wherein the pedestal base and the inner sleeve each comprise respective locking devices such that the respective locking devices engage each other to form an interlocking joint.

4. The ignition unit in accordance with claim 3, wherein the respective locking devices comprise a circular locking groove provided in the pedestal base and a circular ridge provided on an inner rim of the inner sleeve.

5. The ignition unit in accordance with claim 4, further comprising a cup-shaped filling sleeve having a base with an aperture having a diameter which corresponds to an outer diameter of the inner sleeve, and wherein the filling sleeve is arranged in such a way that the inner sleeve projects into the filling sleeve.

6. The ignition unit in accordance with claim 5, wherein an outer diameter of the filling sleeve corresponds to an inner diameter of the propellant charge sleeve.

7. The ignition unit in accordance with one of the foregoing claims, further comprising ferrite cores arranged in the ignition carrier in the vicinity of the connecting leads.

8. The ignition unit in accordance with claim 1, in combination with a gas generator pressure tube which receives the ignition unit, wherein, to secure the propellant charge sleeve to the ignition carrier, the ignition carrier comprises a rim over which the propellant charge sleeve is fitted, wherein the propellant charge sleeve comprises an outwardly angled rim and the ignition carrier comprises a circular ridge against which the outwardly angled rim of the propellant charge sleeve rests, wherein the pressure tube has a step and a rim flange with a recess formed therebetween, and wherein the recess receives the ridge and the outwardly angled rim between the step and the rim flange to form a pressure sealing joint.

9. The ignition unit in accordance with claim 8, further comprising an inner sleeve, wherein the ignition carrier integrally comprises an outlet for the bridge wire carrier, and a pedestal base in the vicinity of the bridge wire carrier outlet, wherein the inner sleeve is arranged on the pedestal base, and wherein the pedestal base and the inner sleeve each comprise respective locking devices such that the respective locking devices engage each other to form an interlocking joint.

10. The ignition unit in accordance with claim 9, wherein the respective locking devices comprise a circular locking groove provided in the pedestal base and a circular ridge provided on an inner rim of the inner sleeve.

11. The ignition unit in accordance with claim 10, further comprising a cup-shaped filling sleeve having a base with an aperture having a diameter which corresponds to an outer diameter of the inner sleeve, and wherein the filling sleeve is arranged in such a way that the inner sleeve projects into the filling sleeve.

12. The ignition unit in accordance with claim 11, wherein an outer diameter of the filling sleeve corresponds to an inner diameter of the propellant charge sleeve.

13. The ignition unit in accordance with one of the foregoing claims 8 to 12, further comprising ferrite cores arranged in the ignition carrier in the vicinity of the connecting leads.

* * * * *

UNITED STATES PATENT AND TRADEMARK OFFICE
CERTIFICATE OF CORRECTION

PATENT NO. : 5,634,660
DATED     : Jun. 3, 1997
INVENTOR(S) : Fink et al.

It is certified that error appears in the above-identified patent and that said Letters Patent is hereby corrected as shown below.

On the title page, item [56]

In "References Cited U. S. PATENT DOCUMENTS"
insert the following references:

--4,690,063  9/1987  Granier et al.--;
  5,241,910  9/1993  Cunningham et al.;
  5,343,872  9/1994  Takahashi et al.;
  5,433,147  7/1995  Brede et al.;
  5,487,559  1/30/96 Headley.--.

Signed and Sealed this

Seventh Day of October, 1997

Attest:

BRUCE LEHMAN

*Attesting Officer*                *Commissioner of Patents and Trademarks*